(12) United States Patent
Frame

(10) Patent No.: US 11,321,770 B2
(45) Date of Patent: May 3, 2022

(54) WORK REQUEST DATA SYSTEM AND METHOD OF USE

(71) Applicant: Fairmarket LLC, Frisco, TX (US)

(72) Inventor: Matthew Frame, Frisco, TX (US)

(*) Notice: Subject to any disclaimer, the term of this patent is extended or adjusted under 35 U.S.C. 154(b) by 0 days.

(21) Appl. No.: 16/815,982

(22) Filed: Mar. 11, 2020

(65) Prior Publication Data

US 2020/0294104 A1    Sep. 17, 2020

Related U.S. Application Data

(60) Provisional application No. 62/817,002, filed on Mar. 12, 2019.

(51) Int. Cl.
| | |
|---|---|
| *G06Q 30/02* | (2012.01) |
| *G06T 17/00* | (2006.01) |
| *G06F 3/0484* | (2022.01) |
| *G06Q 30/06* | (2012.01) |
| *G06Q 30/08* | (2012.01) |
| *G06T 17/10* | (2006.01) |
| *G06Q 10/00* | (2012.01) |
| *G06T 7/62* | (2017.01) |
| *G06Q 50/16* | (2012.01) |
| *G06F 3/04815* | (2022.01) |

(52) U.S. Cl.
CPC ........... *G06Q 30/08* (2013.01); *G06F 3/0484* (2013.01); *G06F 3/04815* (2013.01); *G06Q 10/20* (2013.01); *G06Q 30/0206* (2013.01); *G06Q 30/0283* (2013.01); *G06Q 30/0611* (2013.01); *G06Q 50/16* (2013.01); *G06T 7/62* (2017.01); *G06T 17/00* (2013.01); *G06T 17/10* (2013.01); *G06T 2200/08* (2013.01); *G06T 2207/10032* (2013.01); *G06T 2207/30184* (2013.01)

(58) Field of Classification Search
CPC ............................. G06Q 30/0611; G06T 7/62
See application file for complete search history.

(56) References Cited

U.S. PATENT DOCUMENTS

| | | | |
|---|---|---|---|
| 7,596,512 B1 | 9/2009 | Raines et al. | |
| 7,945,483 B2 | 5/2011 | Inghelbrecht et al. | |
| 7,974,863 B2 | 7/2011 | Etzioni et al. | |
| 9,911,147 B2 | 3/2018 | Roy | |
| 10,068,336 B1 | 9/2018 | Zhang et al. | |
| 2003/0036972 A1 | 2/2003 | Zamma et al. | |
| 2003/0200168 A1 | 10/2003 | Cullen et al. | |
| 2009/0132436 A1* | 5/2009 | Pershing | G06T 17/10 705/400 |
| 2009/0234692 A1 | 9/2009 | Powell et al. | |
| 2009/0240602 A1 | 9/2009 | Mohr et al. | |
| 2014/0316614 A1 | 10/2014 | Newman | |
| 2019/0156570 A1* | 5/2019 | Sanjurjo | G06K 9/00637 |

* cited by examiner

*Primary Examiner* — Ryan McCulley
(74) *Attorney, Agent, or Firm* — Braxton Perrone, PLLC; Gregory Perrone; Bobby W. Braxton

(57) ABSTRACT

A work request data system wherein a user a person such a homeowner to access and possess accurate information about the physical measurements of a structure or other object as derived from a three-dimensional model of the property. The interface generates the measurement through an extraction module.

19 Claims, 5 Drawing Sheets

WORK REQUEST DATA SYSTEM AND METHOD OF USE

CROSS-REFERENCE TO RELATED APPLICATION

This application claims priority to U.S. Provisional Application No. 62/817,002 filed Mar. 12, 2019. All technical disclosures of this application are herein incorporated by reference.

BACKGROUND OF INVENTION

Field of the Invention

The present invention relates generally to commerce systems, and more specifically, to a work request data system that allows for the efficient population of the data needed to accurately estimate the cost of a job.

Description of Related Art

Commerce systems are well known in the art and are effective means to enabled multiple parties to transfer goods, services, commodities or the like between them. For example, FIG. 1 depicts a conventional job bidding system 101 having a homeowner 103 that needs work performed to their home 105 and a contractor 109. In use, the owner 103 initiates a repair request 107 with the contractor 109 who visits the home 105 to acquire information 111 needed to provide a bid 113 or cost estimate to the homeowner 103.

One of the problems commonly associated with system 101 is its limited efficiency. For example, the time and effort of the contractor 109 is only profitable if the homeowner 103 selects the bid 113 of the contractor 109. It will be understood that the homeowner 103 could request the services of multiple contractors 109.

Additionally, the accuracy of the information 111 acquired by the contractor 109 is dependent on their skill potentially causing over cost or under cost bids. It will be understood that if the bid is too low and selected by the homeowner 103 that contractor 109 will spend more to perform the work than they collect from the homeowner 103

Accordingly, although great strides have been made in the area of job bidding systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
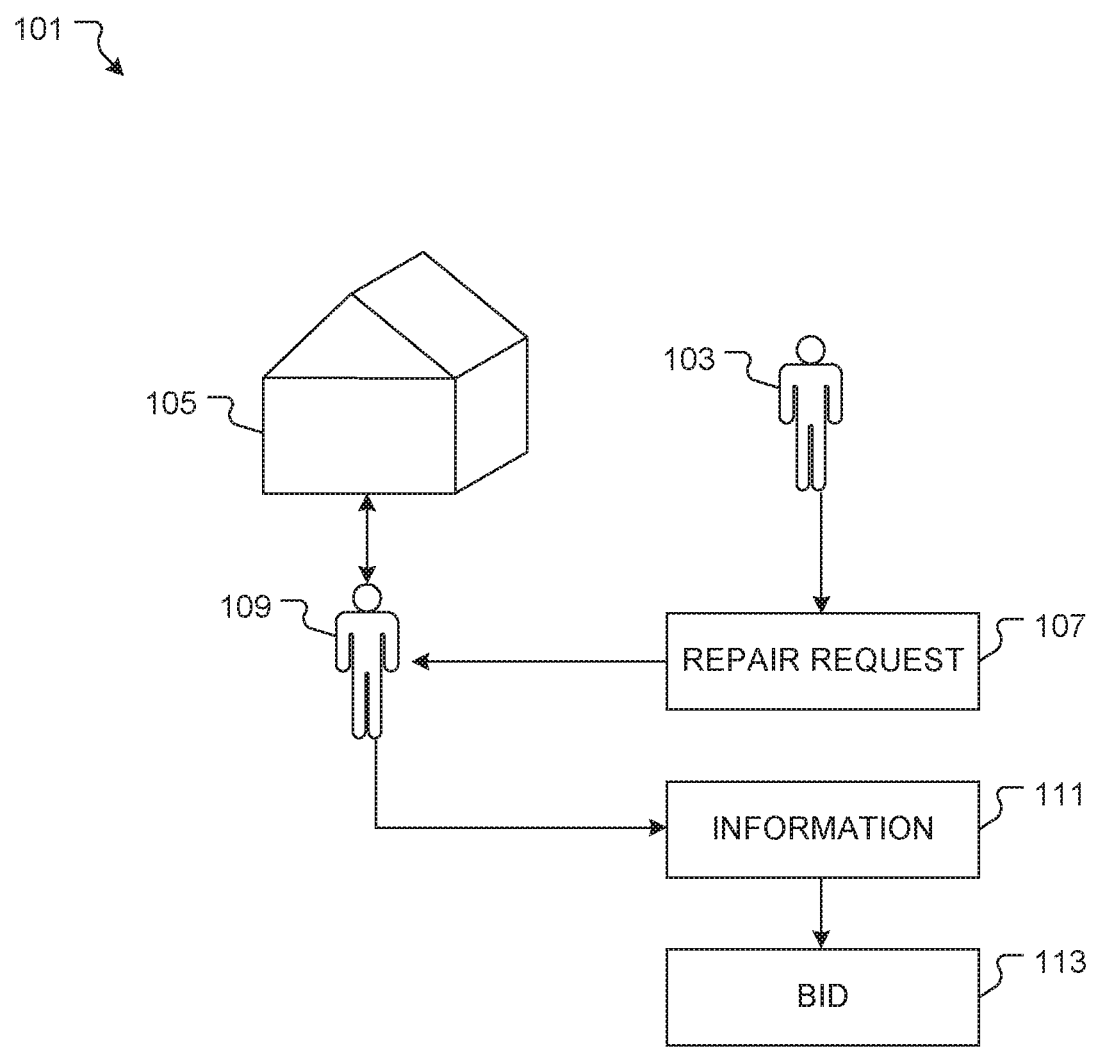
FIG. 1 is a diagram of a common job bidding system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional job bidding system. Specifically, the invention of the present application enables the collection of information pertinent to the bid request without sending a person to visit the location of the requested bid. In addition, the invention of the present application enables the collection of exact information pertinent to the bid request. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
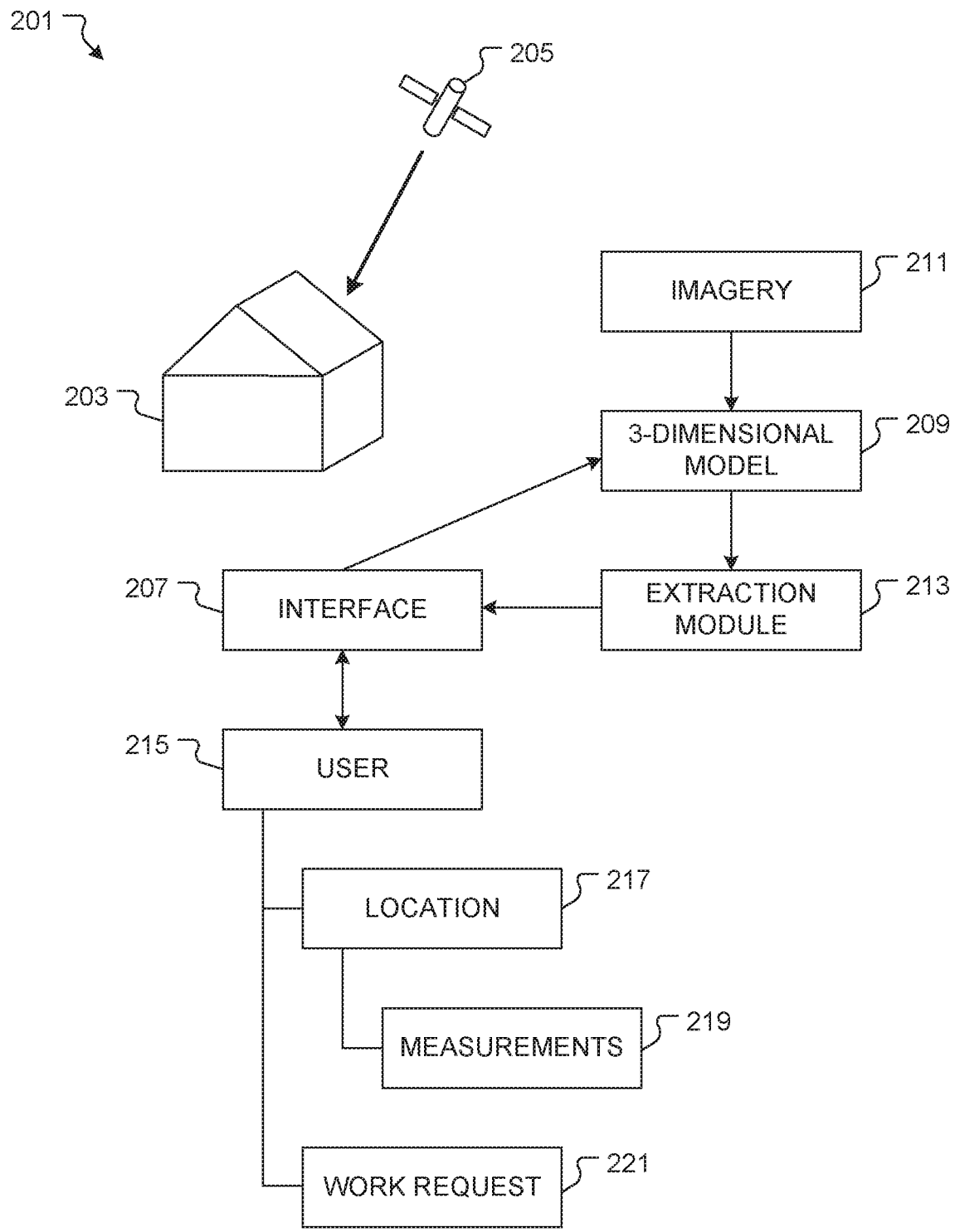
FIG. 2 is a diagram of a work request data system in accordance with a preferred embodiment of the present application.

Referring now to the drawings wherein like reference characters identify corresponding or similar elements throughout the several views, FIG. 2 depicts a diagram of a work request data system in accordance with a preferred embodiment of the present application. It will be appreciated that system 201 overcomes one or more of the above-listed problems commonly associated with conventional job bidding systems.

In the contemplated embodiment, system 201 includes a building 203, imagery 211 taken by a photography source 205 and an interface 207. The interface 207 includes an extraction module 213 that interrogates a three-dimensional model 209 derived from the imagery 211. Imagery 211 can be captured by various methods, including aerial photography taken by jets or drones equipped with suitable photography equipment. Imagery 211 includes images of structures such as homes, commercial buildings and the like. Imagery 211 collected by these methods is used to create a three dimensional model 209 of the structure. The images are recorded at various angles and distances and aggregated into imagery of a structure of interest, such as a home. This model replicates the structure recorded by aerial equipment is stored as imagery data 211 and the corresponding three-dimensional model 209 is stored in a suitable storage medium.

Extraction module 213 retrieves three dimensional model 209 created by a three dimensional model engine. The three dimensional model engine creates three dimensional model 209 based on imagery data 211 that is aggregated from images recorded or retrieved by aerial camera as described. Extraction module 213 and parses data associated with the three dimensional model, including distance and size data of various features of the object depicted in three dimensional model 209. In one embodiment, if the subject of three dimensional model 209 is a residential home, extraction module 213 uses a Cartesian coordinates system to create numerical coordinates on features of the three dimensional model 209 (the home) and determine dimensions of those features. In the example of the residential home, the dimensions of the outside of the home are determined, including exterior wall height and width, roof area, window and door location and dimensions and the like. The various dimension information associated with features of the subject of three dimensional model 209 are stored in a suitable storage medium.

In use, the interface 207 is activated by a user 215, the user 215 inputs a location that is taken by the interface 207 matched with a corresponding three-dimensional model 209 that is then interrogated by the extraction module 213 to derive measurements 219 of the building 203 at the location 217. These measurements 219 are then attached to a work request 221 for the location 217 submitted by the user 215. Interface 207 can be a graphical user interface (GUI) displayed to a user via a known computing device, such as a personal computer, tablet, smartphone and the like. A corresponding application program invokes execution of the user interface on the user's device. In one embodiment, the three dimensional model 209 and the attributes extracted therefrom by extraction module 213

In one embodiment, the attributes of the three dimensional model 209 extracted by extraction module 213 are the subject of a bid solicitation process invoked by a user, such as a homeowner, with a bidding opportunity presented to a vendor. Through interface 207 a user 215 enrolls in a bid collection program provided by an operator of the described system. User 215 creates an account and provides user data that is stored in suitable storage media. Such user data includes the user's name and property location data, such as an address or property tax identification data maintained by local municipality. Based on the property location data provided by user 215, the system will determine if imagery 211 and corresponding data created by extraction module 213 for the structure at the property location exist. If so, various measurements and property features associated with the property will be attributed to the user account. This can include property dimensions, location and dimension of windows, doors, and gutters, roof surface area and the like.

In another embodiment, an on demand price generator provides a fixed or flat price for a project associated with a work request. The on demand price is based on the dimension data for the physical feature of interest for the structure as well as labor and material costs for the location. The user requesting services or the vendor submitting bids, or both, can submit bids in one or both modes in the case of the vendor. Similarly, the user can solicit bids in one or both modes.

Once the user 215 creates an account and the user property has been identified as a property for which the system has extraction data retrieved by extraction module 213, an image of the user's property will be made available via under interface 207. The image can be rotatable via known graphical user interface and software techniques. The image can be the three dimensional model 209 of the imagery recorded for the structure. In one embodiment, imagery 211 is displayed to user 215 via the display on the computing device used by user 215. Links or softkeys are embedded within points of interest in the image displayed. These links or softkeys can be positioned on a feature of interest, such as doors or walls of the home. A link or softkey on a window could be activated by user 215 if user 215 wishes to receive a quote or bid to replace the glass of a broken window or receive a bid for one or more window replacements. Similarly, a link or softkey situated on an exterior wall could be activated if user 215 wishes to receive bids for exterior painting. Any combination of possible jobs associated with the feature of the structure are made available to the user once the link or softkey is activated.

In connection with the structure feature that user 215 can selection, the attributes of the feature are associated with the feature. These attributes include the dimensions or measurements 219 of the feature, a feature type, and the location of the feature on the structure (for example, southeast exterior wall, roof, etc.) and the geographic location 217 of the feature. The geographic location can be based on one or more of county, city, state, neighborhood, subdivision, school district or any other boundary identifier of interest. Global coordinates can also serve as the value of location 217.

User 215 interested in soliciting bids for a repair or replacement of a feature of the subject property can do so by depressing a link or softkey associated with the property feature. Once depressed, work request 221 is created. This work request 221 provides the details described above as attributes of the feature and also provide property address, user name and location 217. Work request 221 includes the measurements or dimensions of the feature of the structure of interest.

Vendors in the relative fields for the property feature interested in submitting bids to user 215 for a particular work request 221 can be pre-enrolled in the bid solicitation platform according to the embodiments of the present invention. Vendors create a profile and can self-populate their profile with vendor attributes based on, among other things, field(s) of interest or expertise (window replacement, landscaping, painting, roof repair, etc.) and geographic area of interest. According to these vendor attributes, when user 215 invokes work request 221, vendors having a profile having attributes that match those of work request 221 are notified through an interface on the vendor device that work request 221 has been submitted in an area that matches the vendor attributes. The platform described herein enables a posting of segmented job requests and creates a bidding network for work requests 221 providing exact measurements and other attributes needed by a vendor to solicit bids without first visiting the job location. This reduces vendor and in turn user cost and enables faster project inception and completion.

The bid solicitation platform described herein can in one embodiment retrieve vendor customer reviews from various vendor websites or user websites through which users can post reviews, as well as the various social media outlets.

It is contemplated that the three-dimensional model 209 is any data set that defines a building, structure or other object in a multi-dimensional way. It is contemplated that the three-dimensional model 209 is displayed in any format such as two-dimensional drawings.

Figure 3:
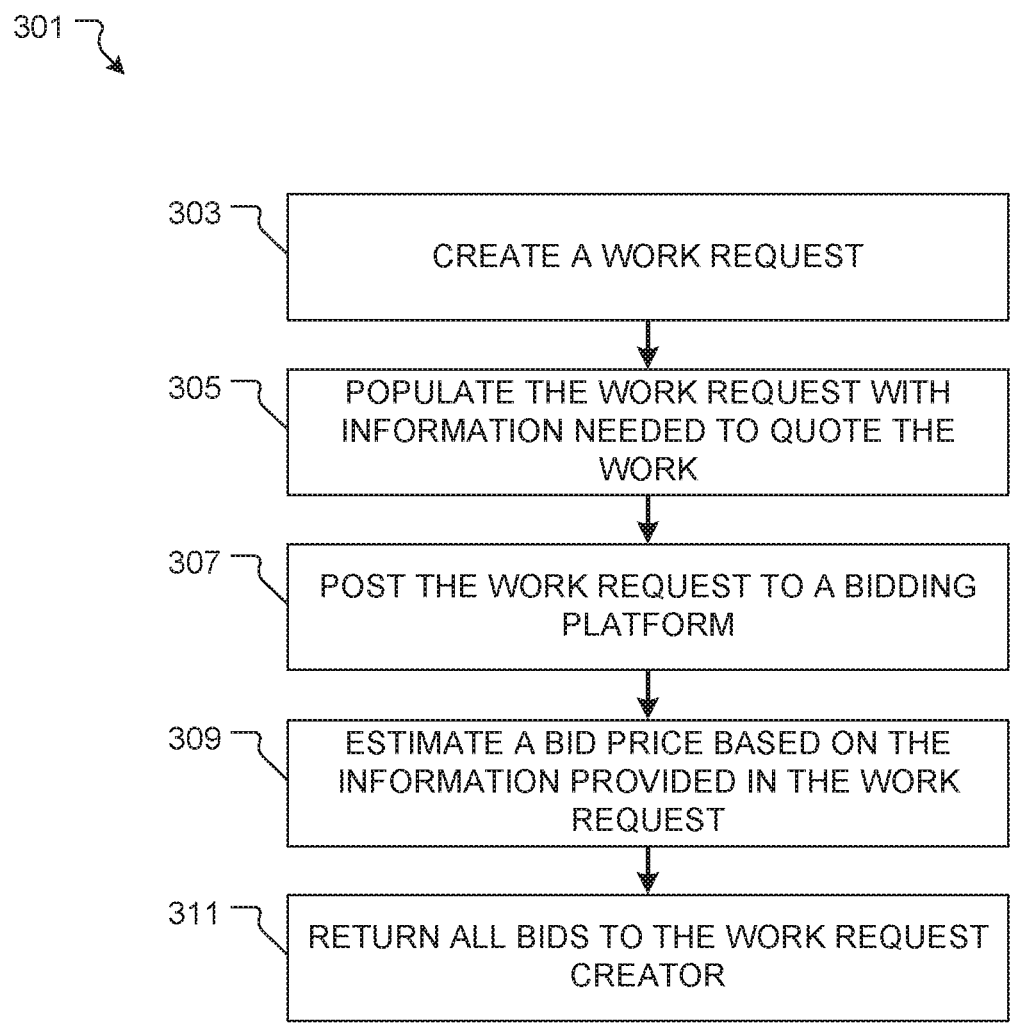
FIG. 3 is flowchart of a contemplated use of the system of FIG. 2.

It is further contemplated that this work request 221 as compiled by the interface 207 is passed to a bidding process 301 as described in FIG. 3. Process 301 includes creating a work request 303, populating the work request with the information needed to quote the work 305, posting the work request to a bidding platform 307, estimating a bid price based on the information provided in the work request 309 and returning all bids to the work request creator 311. It is contemplated that any number of bids could be submitted to the creator of the work request.

It is contemplated that any amount of data, such as the three-dimensional model 209, the measurements 219 or the like could be attached to the work request to facilitated the bidding process.

It should be appreciated that one of the unique features believed characteristic of the present application is that extraction module 213 automatically interrogates and derives the measurements 219 need to properly bid on a work request. It will be appreciated that thereby the need for a person to travel to and measure a building is eliminated. The improvements in this invention serve both to reduce the cost of the work and decrease the time needed to obtain a bid on completing the work request 221.

It should also be appreciated that the extraction module 213 is capable of producing the measurements in a repeatable and error-free manner. This prevents underbidding or over bidding a job to increase the profitability of those completing the work request 221

Figure 4:
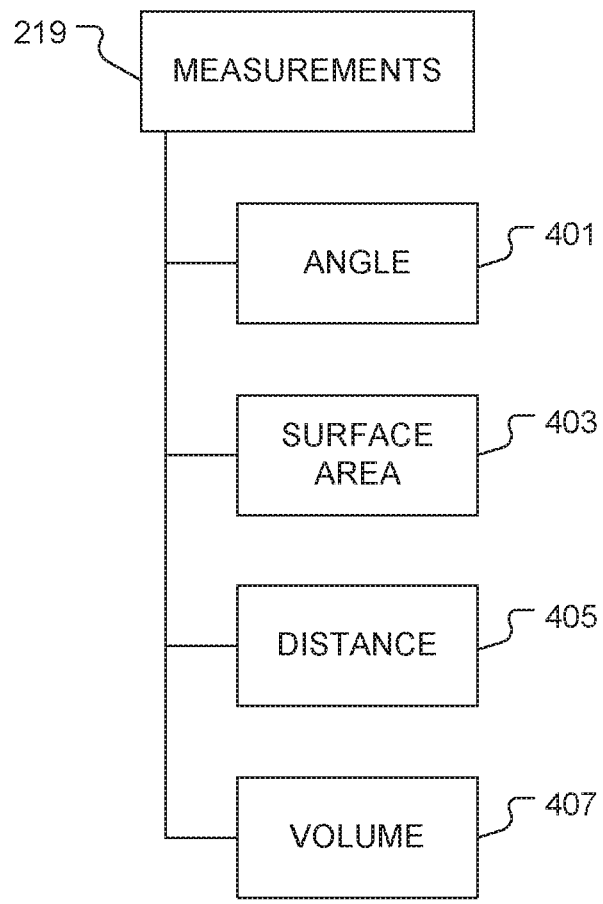
FIG. 4 is a simplified schematic of the measurement types of FIG. 2.

It is contemplated and will be appreciated that any form of data available from a three-dimensional model could be derived by the extraction module 213. Referring to FIG. 4, examples of the possible measurements 219 are depicted. Measurements 219 include angles 401 or slopes, surface areas 403, distances 405 or volumes 407. As shown in FIG. 4, measurements 219 include various angle data 401 that may be of importance for a particular project, surface area 403, such as for roof replacement or repair or painting and distances 405, such as length, width and height of various structure features, such as doors or windows, and volume 407, such as for a swimming pool. While these examples are provided, they are not intended to limit the scope of the invention.

Figure 5:
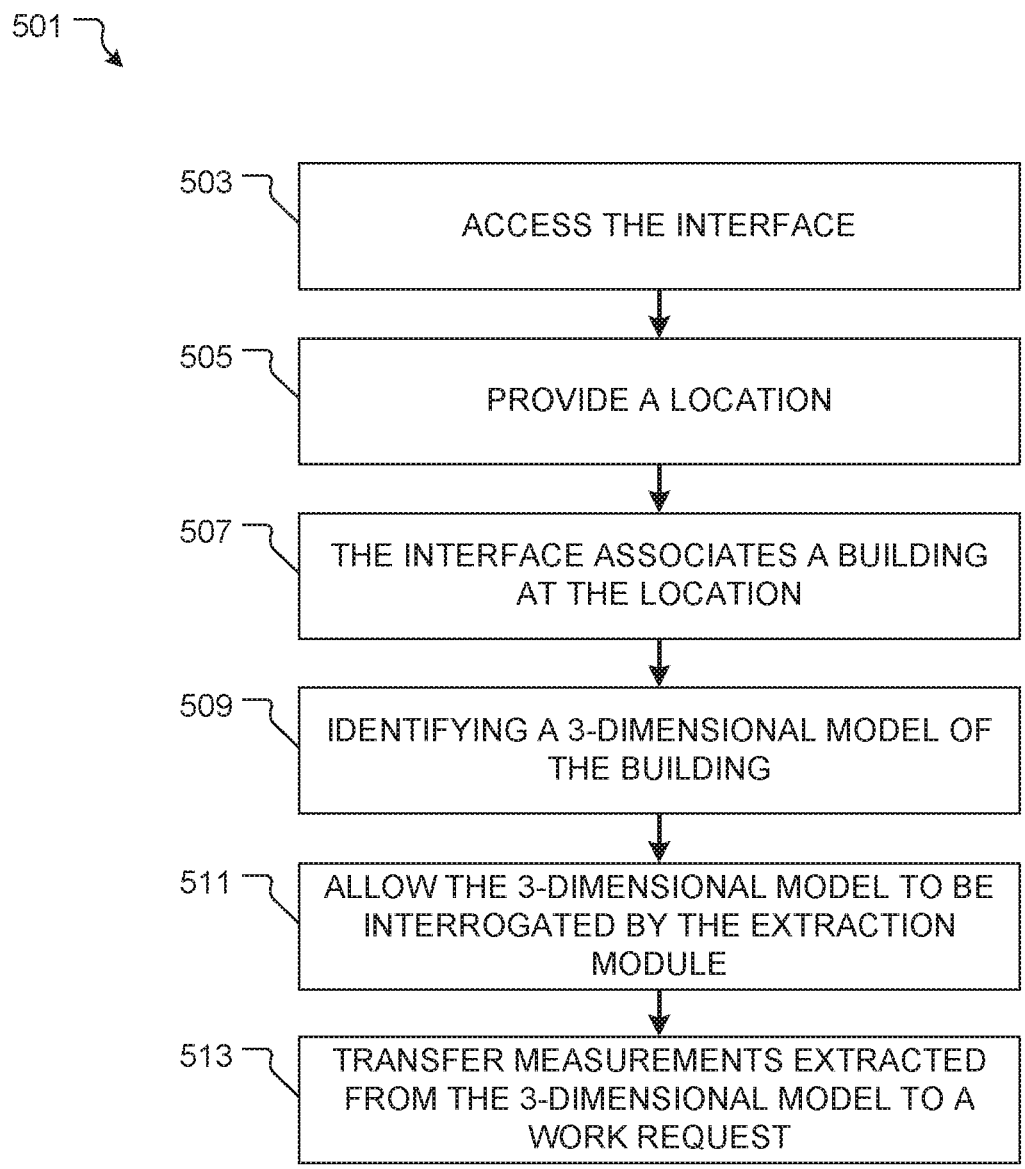
FIG. 5 is a flowchart of the preferred method of use of the system of FIG. 2.

Referring now to FIG. 5 the preferred method of use of the system 201 is depicted. Method 501 includes accessing an interface 503, providing a location 505, the interface associating a building with the provided location 507, identifying a three-dimensional model of the building 509, allowing the three-dimensional model to be interrogated by an extraction module 511 and transferring measurements extracted from the three-dimensional model to a work request 513.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

I claim:

1. A work request data system comprising:
   a three dimensional model engine that creates at least one three dimensional model of an object from collected image data of the object;
   an extraction module that retrieves the at least one three dimensional model of the object and extracts dimension data associated with the object prior to a user interacting with the system;
   a user interface in communication with the extraction module and the at least one three-dimensional model engine, wherein the user interface is configured to embed a user interface interaction key within a physical feature in a displayed image of the at least one three dimensional model in response to identifying that extracted dimension data exists for the physical feature;
   a bid solicitation notification engine that transmits a bid solicitation request including the extracted dimension data for the physical feature and one or more additional attributes of the physical feature upon the user activating the user interface interaction key;
   wherein the extraction module causes display of at least one measurement of the three-dimensional model to the user via the user interface,
   wherein the at least one measurement is included in a work order.

2. The system of claim 1, wherein a location of the object according to a geographical attribute is associated with the three-dimensional model.

3. The system of claim 1 wherein the three-dimensional model of the object is generated according to recorded imagery data of the object.

4. The system of claim 1, wherein the dimension data extracted from the three dimensional model comprises length, width, height, volume, and surface area of the object.

5. The system of claim 1, wherein the bid solicitation request is transmitted to at least one recipient according to a correlation between the at least one attribute of the object and the location of the object and a pre-defined attribute of the recipient.

6. The system of claim 1, further comprising an on demand price generator that generates a work request price according to the extracted dimension data.

7. A work request data system comprising:
   an extraction module that retrieves at least one three dimensional model of an object and extracts dimension data associated with the object prior to a user interacting with the system;
   a user interface having an interaction key embedded within a physical feature in a displayed image of the at least one three-dimensional model of the object and dimension data extracted from the at least one three-dimensional model, wherein the interaction key is embedded in response to identifying that extracted dimension data exists for the physical feature;
   a bid solicitation notification engine that transmits a bid solicitation request including the extracted dimension data for the physical feature and one or more additional attributes of the physical feature upon the user activating the interaction key embedded within the displayed image, wherein display of at least one measurement of the at least one three-dimensional model via the user interface is based on data received from the extraction module, wherein the at least one measurement is included in a work order.

8. The system of claim 7, wherein a location of the object according to a geographical attribute is associated with the three-dimensional model.

9. The system of claim 7 wherein the three-dimensional model of the object is generated according to recorded imagery data of the object.

10. The system of claim 7, wherein the dimension data extracted from the three dimensional model comprises length, width, height, volume, and surface area of the object.

11. The system of claim 7, wherein the bid solicitation request is transmitted to at least one recipient according to a correlation between the at least one attribute of the object and the location of the object and a pre-defined attribute of the recipient.

12. The system of claim 7, wherein the at least one three dimensional model is based on collected image data of the object.

13. The system of claim 7, further comprising an on demand price generator that generates a work request price according to the extracted dimension data.

14. A method for generating a work request in a work request data system, comprising:
    creating via a three dimensional model engine at least one three dimensional model of an object from collected image data of the object;
    retrieving via an extraction module the three dimensional model of the object and extracting dimension data associated with the object prior to a user interacting with the work request data system;
    associating a user interface interaction key embedded within a displayed image with a physical feature depicted on the at least one three-dimensional model of the object extracted from the image data of the object and extracted object dimension data, wherein the user interface interaction key is embedded within the physical feature depicted in the displayed image in response to identifying that extracted dimension data exists for the physical feature;
    transmitting a bid solicitation notification including the extracted dimension data for the physical feature depicted on the at least one three-dimensional model and one or more additional attributes of the object physical feature upon the user activating the user interface interaction key,
    displaying at least one measurement of the at least one three-dimensional model to the user via the user interface,
    wherein the at least one measurement is included in a work request.

15. The method of claim 14, further comprising assigning a location of the object according to a geographical attribute with the three-dimensional model.

16. The method of claim 14, wherein the step of generating the three-dimensional model of the object is based on recorded imagery data of the object.

17. The method of claim 14, wherein the step of associating the user interface interaction key embedded within a displayed image with extracted object dimension data comprises associating length, width, height, volume, and surface area of the object with the user interface interaction key.

18. The method of claim 14, wherein the step of transmitting the bid solicitation notification comprises transmitting the bid solicitation notification according to a correlation between the at least one attribute of the object and the location of the object and a pre-defined attribute of the recipient.

19. The method of claim 14, further comprising setting an on demand price for a work request price according to the extracted dimension data.

* * * * *